US010233397B2

(12) United States Patent
Leinekugel Le Cocq et al.

(10) Patent No.: US 10,233,397 B2
(45) Date of Patent: Mar. 19, 2019

(54) LIQUID-LIQUID EXTRACTION COLUMN USING PLATES EQUIPPED WITH A PRESSURE DROP GENERATOR ELEMENT

(71) Applicant: IFP ENERGIES NOUVELLES, Rueil-Malmaison (FR)

(72) Inventors: Damien Leinekugel Le Cocq, Lyons (FR); Frederic Augier, Saint Symphorien D'ozon (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 462 days.

(21) Appl. No.: 14/083,661

(22) Filed: Nov. 19, 2013

(65) Prior Publication Data

US 2014/0138285 A1 May 22, 2014

(30) Foreign Application Priority Data

Nov. 20, 2012 (FR) ...................... 12 03121

(51) Int. Cl.
*B01D 11/04* (2006.01)
*C10G 21/08* (2006.01)

(52) U.S. Cl.
CPC ............ *C10G 21/08* (2013.01); *B01D 11/043* (2013.01); *C10G 2300/202* (2013.01); *C10G 2300/203* (2013.01)

(58) Field of Classification Search
CPC ...................................................... B01D 11/043
See application file for complete search history.

(56) References Cited

U.S. PATENT DOCUMENTS

| 2,794,711 | A |   | 6/1957 | Hall et al. |            |
|-----------|---|---|--------|-------------|------------|
| 2,872,295 | A |   | 2/1959 | Pohlenz     |            |
| 2,895,809 | A | * | 7/1959 | Pohlenz     | B01D 3/22  |
|           |   |   |        |             | 196/46     |
| 3,354,080 | A | * | 11/1967 | Haslam     | C10G 19/04 |
|           |   |   |        |             | 208/230    |
| 4,081,354 | A |   | 3/1978 | Christman   |            |
| 2012/0043259 | A1 | * | 2/2012 | Norton   | C10G 21/06 |
|           |   |   |        |             | 208/189    |
| 2012/0135489 | A1 | * | 5/2012 | Weydahl  | C07H 1/08  |
|           |   |   |        |             | 435/165    |
| 2014/0066682 | A1 | * | 3/2014 | Tertel    | C10G 31/09 |
|           |   |   |        |             | 585/802    |

OTHER PUBLICATIONS

"Mass-Transfer Efficiency of a Large-Scale Sieve Tray Extractor"—Seibert, Frank A. et al—Ind. Eng. Chem. Res., 1993, 32, 2213-2219 (Year: 1993).*
"Liquid-Liquid Extraction Operations and Equipment"—Chapter 15 from "Perry's Chemical Engineers' Handbook", pp. 16-20, 35, and 36—Robbins, Lanny A. et al—McGraw-Hill, 1999 (Year: 1999).*
Search Report dated Jul. 17, 2013 issued in corresponding FR 1203121 application (pp. 1-2).

\* cited by examiner

*Primary Examiner* — Krishnan S Menon
*Assistant Examiner* — Bradley R Spies
(74) *Attorney, Agent, or Firm* — Millen White Zelano and Branigan, PC; John Sopp

(57) ABSTRACT

The present invention describes a liquid-liquid extraction column with perforated plates and overflows, the plates also being equipped with an additional friction element which makes it possible to increase the thickness of the layer of coalesced matter and to guarantee a counter-current flow of the continuous and dispersed phases.

16 Claims, 3 Drawing Sheets

LIQUID-LIQUID EXTRACTION COLUMN USING PLATES EQUIPPED WITH A PRESSURE DROP GENERATOR ELEMENT

FIELD OF THE INVENTION

The invention relates to the field of liquid-liquid extraction or solvent-extraction operations involving bringing a hydrocarbon phase into contact with a phase which is partially immiscible with the hydrocarbon charge and containing a water fraction.

A particular case is extraction of sulphur-bearing compounds from a hydrocarbon phase by an aqueous solution of sodium hydroxide (concentrated by 10% to 20% by weight with respect to the total solution), the hydrocarbon phase then being the dispersed phase and the aqueous solution of sodium hydroxide being the continuous phase.

EXAMINATION OF THE PRIOR ART

The principle of extraction by solvent between two partially immiscible phases has been known for several decades. If a raffinate phase containing the solute is brought into contact with an extracted phase containing none (or little) thereof, a transfer of the solute occurs from one phase to the other until a thermodynamic equilibrium is attained between the two phases.

The phenomenon is greatly facilitated if, at the state of thermodynamic equilibrium, the concentration of solute in the extracted phase is greater than that in the raffinate phase. The concentration ratio between the two phases at the state of equilibrium is referred as the partition coefficient.

Conventional implementation of liquid-liquid extraction involves bringing the two liquids into contact in a counter-current mode, that is to say in opposite flow directions. In the case of extraction in a vertically positioned column the phases are then referred to as a light phase and a heavy phase.

A very common situation is that involving systems composed of an organic or hydrocarbon phase and an aqueous phase. In that case the aqueous phase is very often the heavy phase.

In liquid-liquid extraction a distinction also has to be drawn between the continuous phase and the dispersed phase.

The continuous phase follows a flow which is as close as possible to a plug flow, that is to say without retro-mixing.

The dispersed phase follows a flow which is overall in counter-current relationship with respect to that of the continuous phase and passes through a system of perforated plates which permits the formation of droplets, which droplets coalesce to form a coalesced layer disposed below each perforated plate when the dispersed phase is the light phase (above each plate when the dispersed phase is the heavy phase).

Material exchanges between the continuous phase and the dispersed phase are essentially effected between the droplets of the dispersed and the continuous phase flowing above each plate.

Counter-current implementation makes it possible to constitute a plurality of successive theoretical stages in the column and thus makes it possible to achieve a level of extraction efficiency which is greatly superior to that obtained with a single stage corresponding to thermodynamic equilibrium.

A more precise description of the liquid-liquid extraction operations is to be found in many dedicated works, including *Handbook of Solvent Extraction* by Lo, Baird & Hanson, Krieger Publishing Company, Malabar, 1991, or *Transport Phenomena in Liquid Extraction* by Laddha & Degaleesan, Tata McGraw-Hill Publishing Co Ltd., 1976.

The notions of theoretical stages are particularly described therein, which is an important point for understanding the attraction of the invention.

In an extraction column having plates and overflows the dispersed phase must form a coalesced layer under the plate when the dispersed phase is the light phase or above the plate when the dispersed phase is the heavy phase. The thickness of that coalesced layer must be such that it guarantees that the plate is always in contact with said coalesced phase. A rupture in that coalesced phase, even over only a part of the plate, can cause a serious deterioration in the levels of performance of the column. In fact, in the situation where the coalesced layer does not cover the whole of the surface of the perforated plate there is a flow of the continuous phase through the plate, thus resulting in lower levels of extraction performance than were expected. This is the phenomenon referred to as "bleeding".

The rupture in the coalesced layer can occur for various reasons, for example due to a problem in terms of plate flatness, or disturbances in the interface between the coalesced layer and the continuous phase.

The thickness of the coalesced layer is determined by the pressure drops associated with the flow of the two phases. The different contributions are detailed on pages 15-36 of *Perry's Chemical Engineers Handbook,* 7th ed, McGraw-Hill 1999. The contribution linked to the continuous phase is linked to the pressure drops in the overflow. As regards the dispersed phase it contributes in two ways:
  by its flow through the perforations in the plate, and
  by the effects linked to the interfacial tension involved upon the formation of drops.

Each of those contributions is inversely proportional to the difference in densities of the two liquid phases. Thus the greater the difference in densities, the smaller is the thickness of the coalesced layer.

In addition the term linked to the pressure drop due to the flow through the perforations in the plate is generally predominant. Now, that term is proportional to the density of the dispersed phase. Thus, the lighter the dispersed phase, the smaller the thickness of the coalesced layer.

When the ratio between the density of the dispersed phase and the difference in densities of the liquid phases is too low, it is appropriate to use a very high speed in terms of the flow through the orifices of the dispersed phase to guarantee a minimal coalesced layer thickness. Now, a high speed in terms of the flow through the orifices gives rise to a very broad drop size distribution, with the formation of fine droplets which can be entrained by the continuous phase into the overflow, thus resulting in lower levels of extraction performance than were expected.

It is generally recommended that the liquid-liquid extraction column be operated with an optimum orifice through-flow speed (said optimum value depending on the liquid-liquid system being considered), while having a coalesced layer thickness greater than a low limit of between 30 mm and 70 mm.

The optimum orifice through-flow speed can be calculated using different methods described in the Handbook of Solvent Extraction, already quoted above. The flow configuration sought is that in which the phase to be dispersed issues from the hole in the form of a continuous jet of maximum size.

Breakdown of that jet then generates droplets of small sizes which are ideal for transfer between phases. The optimum range of speeds at the orifices is generally between 0.15 and 0.3 m/s according to the *Handbook of Solvent Extraction*.

However it is not possible to simultaneously comply with those two criteria when the difference in density between the two phases is high (greater than 300 kg/m$^3$) and the light phase is of low density (less than 700 kg/m$^3$).

In the case of a great difference in the densities between phases, observing a minimum coalesced layer thickness implies an orifice through-flow speed which can be higher than the recommended speed for generating a jet of maximum size on issuing from holes.

Accordingly the droplets formed can be of non-homogenous sizes, which is harmful to the transfer and to the hydrodynamics. Indeed there is the danger that the fine droplets can be entrained into the overflows, which can cause a deterioration in the levels of performance of the process.

The column according to the present invention is a liquid-liquid extraction column with plates specifically adapted to the system having a great difference in density between the two liquid phases and in which the light phase is of a low density, so as to guarantee the existence of a coalesced layer above or below each plate.

The existence of that coalesced layer is essential to avoid the bleeding phenomenon and to permit a counter-current flow of the continuous phase and the dispersed phase.

The present invention therefore describes a liquid-liquid extraction column equipped with specific plates which ensure a sufficient pressure drop in passing through said plates even when the ratio of the mass per unit of volume of the dispersed phase to the difference in mass per unit of volume of the two phases (dispersed and continuous) is low.

That ratio of mass per unit of volume can in particular become very small when the difference in mass per unit of volume between the heavy phase and the light phase becomes substantial (for example greater than 300 kg/m$^3$).

In the prior art reference may be made to U.S. Pat. No. 2,872,295 which describes a multi-stage column comprising plates which are formed by an assembly of two plates of different porosities. Those plates are connected in such a way that a liquid layer can be established in the space between the two plates.

Reference may also be made to U.S. Pat. No. 2,794,711 which teaches an arrangement permitting intimate contacting of two liquids by means of contact plates and dispersion baffles. No information regarding a possible difference in the degree of opening of the plates is furnished in that document.

BRIEF DESCRIPTION OF THE INVENTION

Figure 1:
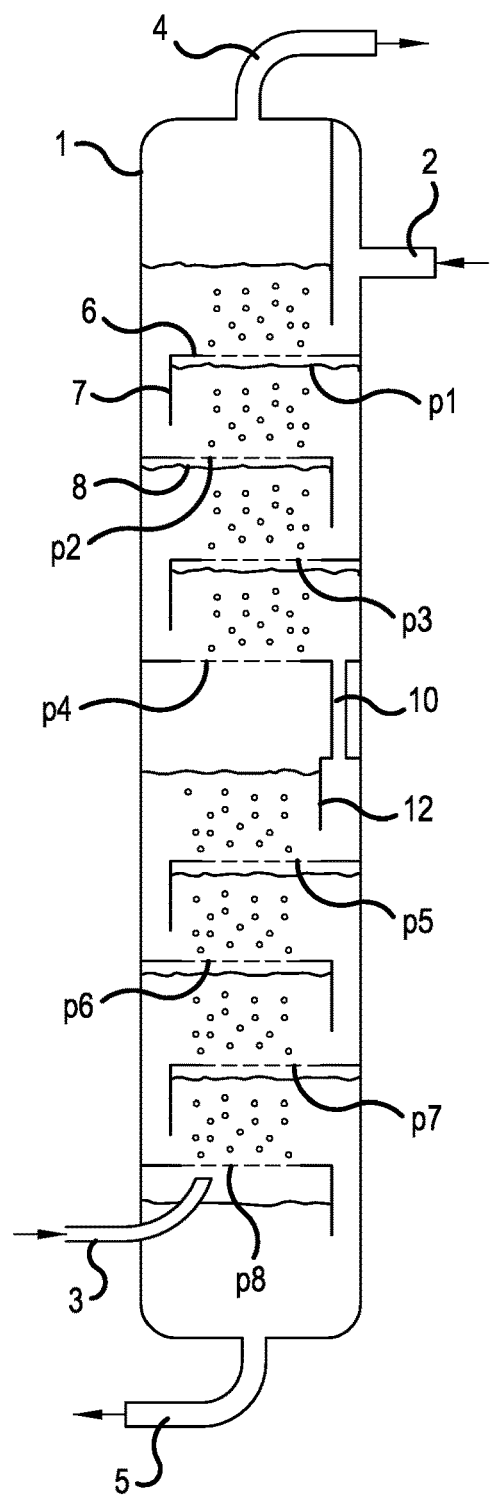
FIG. 1 shows a liquid-liquid extraction column with plates and overflows according to the prior art.

The present invention can be defined as a liquid-liquid counter-current extraction column with perforated plates having overflows for bringing into contact a light dispersed phase and a heavy continuous phase, the solute being transferred from the dispersed phase to the continuous phase, said column being provided with open plates with a degree of perforation of between 2% and 6% and each open plate being completed by an additional friction element of a porosity strictly less than that of the open plate, each friction element being placed below each open plate at a distance of between 0.5 cm and 5 cm below said plate.

When the dispersed phase is the heavy phase and the continuous phase is the light phase the definition of the extraction column according to the present invention becomes: a liquid-liquid counter-current extraction column with perforated plates having overflows for bringing into contact a heavy dispersed phase and a light continuous phase, the solute being transferred from the dispersed phase to the continuous phase, said column being provided with open plates with a degree of perforation of between 2% and 6% which are completed by additional friction elements of a porosity strictly less than that of the open plate, each friction element being a perforated plate placed above each open plate at a distance of between 0.5 cm and 5 cm above said plate.

The porosity expressed in % represents the empty fraction of the plate with respect to the free section of the column.

In a first variant of the present invention the additional friction elements are perforated plates disposed below (or above if the dispersed phase is the heavy phase) each open plate having a porosity equal to p times that of the open plate, p being between 0.6 and 0.9.

In a preferred feature of the present invention the additional friction elements, when they are plates, have their orifices offset with respect to those of the open plate to which it is attached.

In another variant of the present invention the additional friction elements are formed by one or more layers of a material of woven fibres.

According to a preferred feature of the present invention the overflows of each plate have a passage section of between 6% and 20% of the free section of the column.

According to another preferred feature of the present invention the number of plates of the extraction column according to the invention is between 4 and 25 and preferably between 6 and 20.

The extraction column according to the present invention is applied in particular to the extraction of sulphur compounds from a hydrocarbon phase by an aqueous solution of sodium hydroxide representing from 10% to 20% by weight, the hydrocarbon phase being the dispersed phase.

Finally the extraction column according to the present invention is particularly well applied to the case where the difference in density between the heavy phase and the light phase is greater than 300 kg/m$^3$ and the density of the light phase is less than 750 kg/m$^3$.

DETAILED DESCRIPTION OF THE INVENTION

The invention concerns a liquid-liquid counter-current extraction column with perforated plates and overflows, involving a heavy phase and a light phase, between which a solute is exchanged, the difference in mass per unit of volume between the two liquids being high (greater than 300 kg/m$^3$) and the mass per unit of volume of the light phase being low (less than 750 kg/m$^3$).

According to the case involved the light phase can be the continuous phase or the dispersed phase.

Hereinafter in this specification for the sake of clarity we shall adopt the case of a dispersed light phase but the column according to the invention is equally well applied to the case of a heavy dispersed phase.

The essential difference between the two cases represented is that, in the case of a light dispersed phase, the coalescence layer is below the plate while in the case of a heavy dispersed phase it is above the plate.

The object of the invention involves ensuring good functioning of the extraction column by guaranteeing a minimum coalesced layer thickness (that is to say greater than 7 cm) and an optimum speed in terms of flow through the orifices of each plate to generate drops having a very tight size distribution.

The invention cleverly combines a perforated plate referred to as "open" (Po) having a substantial perforated surface area so as to guarantee an optimum speed in terms of flow through the orifices, corresponding to a continuous jet of dispersed phase of maximum size at the orifice outlet, and an arrangement which we shall refer to hereinafter as the additional "friction element" (Pad) making it possible to ensure a coalesced layer thickness greater than 7 cm.

The friction element (Pad) is disposed within the coalesced layer of dispersed phase and at a distance of between 0.5 cm and 5 cm from the open plate with which it is associated.

It generates pressure drops in respect of the dispersed phase, such that the coalesced layer thickness is greater than 7 cm.

According to a first variant of the column according to the invention the friction element (Pad) making it possible to generate the additional pressure drop is a second perforated plate.

If the dispersed phase is the light phase the additional friction element (Pad) is therefore disposed beneath the open perforated plate (Po).

If the dispersed phase is the heavy phase the additional friction element (Pad) is disposed above the open perforated plate (Po).

The degree of perforation of the additional friction element (Pad) is strictly less than that of the "open" perforated plate (Po) in a ratio p of between 0.6 and 0.9 and preferably between 0.6 and 0.8.

The degree of perforation of the open plate is between 2% and 6% with respect to the section of the empty column. To calculate the degree of perforation of the friction element the ratio p is therefore applied to the degree of perforation of the open plate.

Figure 3:
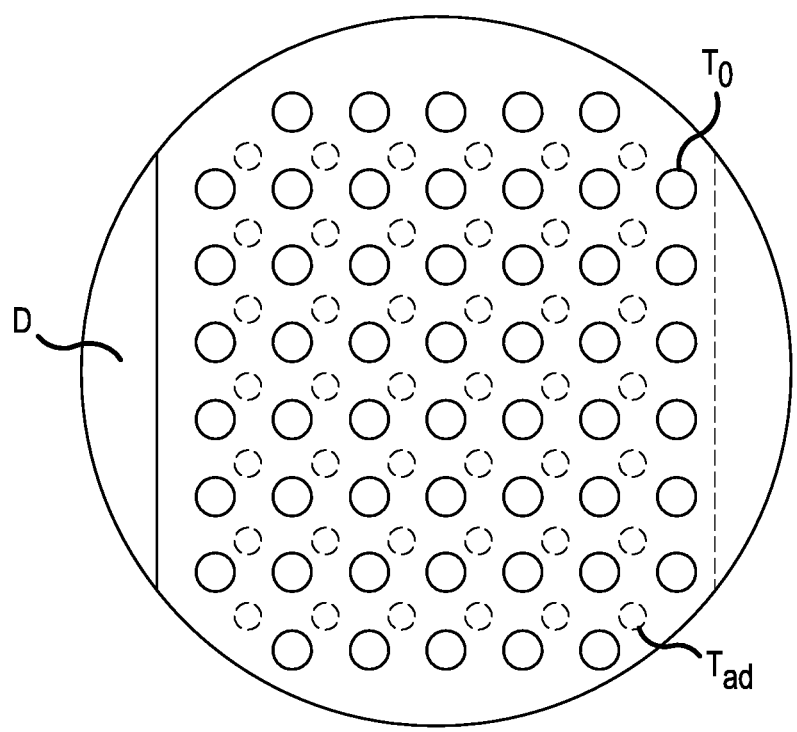
FIG. 3 shows a plan view of a plate according to the invention equipped with an additional friction element which is a plate of strictly lower porosity with its orifices offset with respect to those of the open plate.

The perforations of the friction element (Pad) are so positioned that they are not on the same vertical line as the perforations of the open perforated plate (Po), as is shown in FIG. 3.

In a preferred variant of the present invention the perforations of the friction element (Pad) can be offset so as to be in opposite relationship with respect to the perforations of the open plate (Po) as is shown in FIG. 3. It is very clear that this offset arrangement of the friction element with respect to the open plate maximises the pressure drop caused by said element.

According to a second variant of the process according to the invention the friction element (Pad) permitting generation of the additional pressure drop is an assembly of woven fibres. That friction element thus facilitates coalescence of the dispersed phase and make it possible to maintain the thickness of the coalesced layer (Ch) in the desired range.

More precisely FIG. 1 according to the prior art describes a liquid extraction column fed with a heavy phase by the conduit 2 and a light phase by the conduit 3.

The heavy phase which is the continuous phase issues at the base of the column by way of the conduit 5 and the light phase which is the dispersed phase issues at the head of the column by way of the conduit 4.

The column is equipped with eight overflow-equipped plates of the open type numbered P1 to P8.

Each open plate is composed of a perforated plate (6) and an overflow (7).

The pressure drop generated on passing through the plates induces the presence of a coalesced dispersed phase layer (8) under each plate.

The section and the shape of the overflow of the closed plate can be constant over its entire length or variable as shown in FIG. 1 by the elements of different sections (10) and (12).

Figure 2:
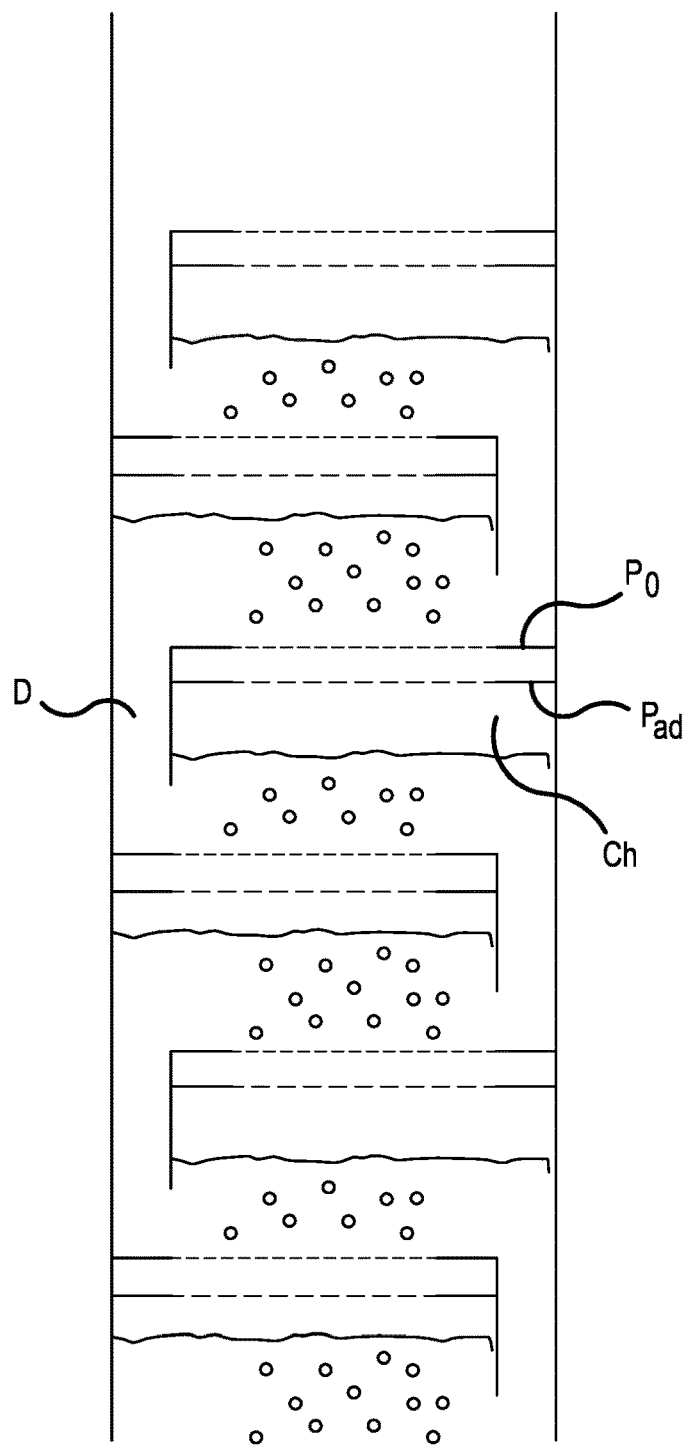
FIG. 2 shows the liquid-liquid extraction column according to the present invention in which each plate is equipped with an additional friction element which here is a plate of a porosity strictly less than the porosity of the open plate.

FIG. 2 according to the invention shows more precisely the association of a plate referenced Po with its friction element which here is a plate referenced Pad. The coalesced layer under the plate is referenced Ch.

D denotes the overflow whose section is between 6% and 20% of the free section of the column.

FIG. 3 according to the invention shows a plan view of an open plate associated with its additional perforated plate disposed below (or above if the dispersed phase is the heavy phase), the additional perforated plate having a porosity equal p times that of the open plate, p being between 0.6 and 0.9. FIG. 3 shows the offset between the orifices (To) of the open plate and those (Tad) of the closed plate disposed below it.

The section (D) of the overflow representing about 8% of the free section of the column is also illustrated.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 12/03.121, filed Nov. 20, 2012 are incorporated by reference herein.

Comparative Example According to the Invention

The comparative example which follows is obtained by simulation.

The liquid charge to be treated is an LPG (liquefied petroleum gas) containing 100 ppm of methanethiol.

The solvent used to extract the methanethiol is a 20% solution of sodium hydroxide.

The dispersed phase is the hydrocarbon phase, the continuous phase is the sodium hydroxide solution.

The flow rates of LPG and sodium hydroxide are 165 and 4.3 m³/h respectively.

The extraction operation is performed at 30° C. and under 10 bars absolute.

Three separate devices are used to perform the extraction operation.

1) The device 1 referred to as an "open plate" device is according to the prior art.

It is formed by an extraction column equipped with 15 perforated plates with overflows, spaced at 1 m, and 2.9 m in diameter. The perforations are 5 mm in diameter and the perforated surface area is equal to 2.9% of the column section so as to have a speed through the orifices of 0.24 m/s, as recommended in the prior art.

The overflows have a surface area equal to 7.3% of the column section. The thickness of a coalesced layer under a plate is then 1 cm.

2) The device 2, still according to the prior art, is referred to as being a "closed plate" device. It is similar in every point to the device 1 but the perforated surface area is equal to 0.7% of the column section.

The speed through the orifices is then 1.01 m/s.

The coalesced layer thickness beneath the plate is then 10 cm.

3) The device 3 is according to the invention. It is formed by an extraction column equipped with 15 plates of open type, such as those equipping the device 1, each plate according to the device 1 being associated with a closed plate according to the device 2, the additional closed plate being located below the open plate. The assembly of open plate (Po)/closed plate (Pad) forms the plate according to the invention.

Each additional closed plate is located below an open plate at a distance of 0.8 cm from the latter.

The perforations in each additional closed plate are so positioned as not to be on the line of the perforations of the open plate disposed just above it. The open plates are spaced at 1 m.

The speed through the orifices is then 0.24 cm/s.

The thickness of the coalesced layer resulting from the plate according to the invention is 10 cm.

A comparison between the three devices can be summarised in the following fashion:

1) The device formed by open plates does not make it possible to ensure a sufficient coalesced layer thickness over the whole of the section of the column to avoid the problems of retro-mixing of the sodium hydroxide which is the continuous phase. The small thickness of the coalesced layer of the hydrocarbon phase permits a fraction of the continuous phase of sodium hydroxide to pass through the perforated plate, giving rise to the bleeding phenomenon and ruling out the desired plug type flow.

That device therefore no longer makes it possible to guarantee a suitable counter-current flow.

The result of this is that the assembly of the open plates behaves like a single theoretical stage.

2) The device formed by closed plates ensures a substantial coalesced layer thickness but, by virtue of the diameter of the orifices, the speed through the orifices is so high that it involves the formation of fine droplets of dispersed phase. Those fine dispersed phase droplets give rise to coalescence problems below the plate, which induces retro-mixing of the sodium hydroxide, as well as a problem of retro-mixing of the hydrocarbon phase due to entrainment of the finest droplets into the overflows by the continuous sodium hydroxide phase.

That device therefore no longer makes it possible to guarantee a suitable counter-current flow.

The result of this is that the assembly of the closed plates behaves like a single theoretical stage.

3) Finally the device according to the invention ensures a good counter-current flow while maintaining a large coalesced layer thickness and generating a tight drop size distribution. The plates then have an efficiency of 18.7%. The device therefore has an equivalent number of theoretical stages of 2.8.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-liquid counter-current extraction column with perforated plates having overflows for bringing into contact a light dispersed phase and a heavy continuous phase, wherein the density of the light dispersed phase is less than 750 kg/m$^3$ and the difference in density between the heavy continuous phase and the light dispersed phase is greater than 300 kg/m$^3$, the solute being transferred from the dispersed phase to the continuous phase, wherein said column is provided with open plates with perforations and a degree of perforation of between 2% and 6% which are completed by additional friction elements of a porosity strictly less than that of the open plate, each friction element being a perforated plate placed below each open plate at a distance of between 0.5 cm and 5 cm below said open plate, and the reduction factor in the porosity of each friction element being between 0.6 and 0.8 with respect to the porosity of an open plate and wherein the additional friction elements have their orifices offset with respect to the perforations of the open plate which it is below, such that the orifices of the additional friction element are in an opposite relationship with the perforations of the open plate.

2. A liquid-liquid counter-current extraction column with perforated plates having overflows for bringing into contact a heavy dispersed phase and a light continuous phase, wherein the density of the light continuous phase is less than 750 kg/m$^3$ and the difference in density between the light continuous phase and the heavy dispersed phase is greater than 300 kg/m$^3$, the solute being transferred from the dispersed phase to the continuous phase, wherein said column is provided with open plates with perforations and a degree of perforation of between 2% and 6% which are completed by additional friction elements of a porosity strictly less than that of the open plate, each friction element being placed above each open plate at a distance of between 0.5 cm and 5 cm above said open plate, and the reduction factor in the porosity of each friction element being between 0.6 and 0.8 with respect to the porosity of an open plate and wherein the additional friction elements have their orifices offset with respect to the perforations of the open plate which it is above, such that the orifices of the additional friction element are in an opposite relationship with the perforations of the open plate.

3. A liquid-liquid extraction column according to claim 1 wherein each open plate has an overflow with a passage section of between 6% and 20% of the free section of the column.

4. A liquid-liquid extraction column according to claim 1 wherein the number of open plates is between 4 and 25.

5. A method for the extraction of sulphur compounds from a hydrocarbon phase by an aqueous solution of sodium hydroxide representing from 10% to 20% by weight, comprising passing the aqueous solution as the heavy continuous phase and the hydrocarbon phase as the light dispersed phase through the liquid-liquid extraction column according to claim 1, wherein the density of the light dispersed phase is less than 750 kg/m$^3$ and the difference in density between the heavy continuous phase and the light dispersed phase is greater than 300 kg/m$^3$.

6. A method for liquid-liquid extraction which comprises contacting a light dispersed phase and a heavy continuous phase in an extraction column according to claim 1, where the difference in mass per unit of volume between the heavy continuous phase and the light phase is greater than 300 kg/m$^3$ and the mass per unit of volume of the light dispersed phase is less than 750 kg/m$^3$.

7. A liquid-liquid extraction column according to claim 2 wherein each open plate has an overflow with a passage section of between 6% and 20% of the free section of the column.

8. A liquid-liquid extraction column according to claim 2 wherein the number of open plates is between 4 and 25.

9. A method for the extraction of sulphur compounds from a hydrocarbon phase by an aqueous solution of sodium hydroxide representing from 10% to 20% by weight, comprising passing the aqueous solution as the heavy dispersed phase and the hydrocarbon phase as the light continuous phase through the liquid-liquid extraction column according to claim 2, wherein the density of the light continuous phase is less than 750 kg/m$^3$ and the difference in density between the heavy dispersed phase and the light continuous phase is greater than 300 kg/m$^3$.

10. A method for liquid-liquid extraction which comprises contacting a light continuous phase and a heavy dispersed phase in an extraction column according to claim 2, where the difference in mass per unit of volume between the heavy phase and the light phase is greater than 300 kg/m$^3$ and the mass per unit of volume of the light continuous phase is less than 750 kg/m$^3$.

11. A liquid-liquid extraction column according to claim 1 wherein the number of open plates is between 6 and 20.

12. A liquid-liquid extraction column according to claim 2 wherein the number of open plates is between 6 and 20.

13. A liquid-liquid extraction column according to claim 1, wherein the column has an equivalent number of theoretical stages of 2.8.

14. A liquid-liquid extraction column according to claim 2, wherein the column has an equivalent number of theoretical stages of 2.8.

15. A liquid-liquid extraction column according to claim 1, wherein the plates have an efficiency of 18.7%.

16. A liquid-liquid extraction column according to claim 2, wherein the plates have an efficiency of 18.7%.

* * * * *